United States Patent
Dai et al.

(10) Patent No.: US 8,471,853 B2
(45) Date of Patent: Jun. 25, 2013

(54) RECONSTRUCTABLE GEOMETRY SHADOW MAPPING METHOD

(75) Inventors: Qinghua Dai, Shanghai (CN); Baoguang Yang, Shanghai (CN)

(73) Assignee: VIA Technologies, Inc., New Taipei (TW)

( * ) Notice: Subject to any disclaimer, the term of this patent is extended or adjusted under 35 U.S.C. 154(b) by 1293 days.

(21) Appl. No.: 12/287,546

(22) Filed: Oct. 10, 2008

(65) Prior Publication Data

US 2009/0109222 A1    Apr. 30, 2009

Related U.S. Application Data

(60) Provisional application No. 60/982,727, filed on Oct. 26, 2007.

(30) Foreign Application Priority Data

May 21, 2008   (TW) ............................... 97118693 A

(51) Int. Cl.
- G06T 15/50    (2011.01)
- G06T 15/60    (2006.01)
- G06T 15/40    (2011.01)

(52) U.S. Cl.
USPC .......................................... 345/426; 345/422

(58) Field of Classification Search
USPC ................................................. 345/426, 422
See application file for complete search history.

(56) References Cited

U.S. PATENT DOCUMENTS

| | | | |
|---|---|---|---|
| 6,094,200 A * | 7/2000 | Olsen et al. | 345/422 |
| 6,151,009 A * | 11/2000 | Kanade et al. | 345/641 |
| 6,621,925 B1 * | 9/2003 | Ohmori et al. | 382/167 |
| 6,791,544 B1 * | 9/2004 | Hong et al. | 345/426 |
| 2002/0085748 A1 * | 7/2002 | Baumberg | 382/154 |
| 2003/0112237 A1 * | 6/2003 | Corbetta | 345/426 |
| 2004/0174373 A1 * | 9/2004 | Stevens et al. | 345/582 |
| 2004/0239673 A1 * | 12/2004 | Schmidt | 345/426 |
| 2006/0250421 A1 * | 11/2006 | Anderson et al. | 345/629 |

* cited by examiner

Primary Examiner — David T Welch
(74) Attorney, Agent, or Firm — J.C. Patents

(57) ABSTRACT

A reconstructable geometry mapping method is provided. The reconstructable geometry mapping method includes: extracting geometry information of a plurality of occluding geometry shapes of an object's front-face with respect to a light source's point of view; performing a consistency test on a testing pixel so as to determine an occluding geometry shape corresponding to the testing pixel from the object's front-face among the plurality of occluding geometry shapes, in which the occluding geometry shape includes an occluding point, and the testing pixel overlaps with the occluding point when viewing from the light's point of view; reconstructing a depth value of an occluding point corresponding to the testing pixel; and performing a shadow determination of the testing pixel.

9 Claims, 7 Drawing Sheets

RECONSTRUCTABLE GEOMETRY SHADOW MAPPING METHOD

CROSS-REFERENCE TO RELATED APPLICATION

This application claims the priority benefit of U.S.A. provisional application Ser. No. 60/982,727, filed on Oct. 26, 2007, all disclosures are incorporated therewith. This application also claims the priority of Taiwan application serial no. 97118693, filed May 21, 2008. All disclosure of the Taiwan application is incorporated herein by reference.

BACKGROUND OF THE INVENTION

1. Field of the Invention

The present invention generally relates to a graphic processing technology, and more particularly, to a reconstructable geometry shadow mapping method.

2. Description of Related Art

Shadow mapping and shadow volume are two popular real time shadowing technologies for computer graphics. Shadow volume is proposed by Frank Crow in 1977, in which the geometry is employed for calculating the 3-dimensional (3-D) shape of a region occluded from a light source. The algorithm utilizes a stencil buffer to calculate whether a pixel is in a shadow or not. A main advantage of the shadow volume technology is that shadow volumes are relatively accurate with respect to the pixel. On the contrary, the accuracy of a shadow map depends on the size of the texture memory as well as how the shadows are casted. Unfortunately, the shadow volume technology demands for a lot of fill time on hardware and runs often slower than the shadow mapping technology, especially when processing a large scale complex geometrical scene.

Shadow mapping is a technology of adding shadows to 3-D computer graphics, which was proposed by Lance Williams in 1978. The algorithm has been widely used in pre-rendered scenes, as well as in real-time applications. A shadow of object is created by testing whether a testing pixel is visible from a light source (by comparing depths of the light-occluding object and the test pixel with respect to a light's view). Shadow mapping is an image space method with simplicity and flexibility. Shadow mapping is one of shadow rendering methods and often runs at a high speed. However, it suffers from aliasing errors and depth bias issues. As such, it becomes an important concern to provide an effective solution to these two drawbacks in the field of shadow rendering techniques.

Aliasing errors in shadow mapping can be categorized into two groups, perspective aliasing errors and projective aliasing errors. A perspective aliasing error often occurs when zooming into a shadow edge. A projective aliasing error often occurs when light rays are nearly parallel to the geometry surface and stretch over a range of depth. Another difficulty for most shadow mapping technologies is the depth bias issue. In order to avoid erroneous self-shadowing problems, William had proposed to add a constant depth bias to depth samples before comparing with a true surface. Unfortunately, too much bias may cause false non-shadowing (looks like a light-occluding object floating above the surface of a light receiver) and push the shadow backward too much. In fact, it is very hard to directly determine the bias value, and it is even impossible to find out an acceptable common value for every simple scenes.

SUMMARY OF THE INVENTION

Accordingly, the present invention is directed to a reconstructable geometry mapping method, for reducing perspective aliasing errors and projective aliasing errors, and providing a solution regarding the bias issues of false self-shadowing and false non-shadowing problems.

The present invention provides a reconstructable geometry mapping method. The reconstructable geometry mapping method includes: extracting geometry information of a plurality of occluding geometry shapes of an object's front-face with respect to a light source's point of view; performing a consistency test on a testing pixel so as to determine an occluding geometry shape corresponding to the testing pixel from the object's front-face among the plurality of occluding geometry shapes; reconstructing a depth value of an occluding point corresponding to the testing pixel; and performing a shadow determination of the testing pixel.

According to an embodiment of the present invention, the geometry information may include vertex coordinates or graphics indices of the geometry shapes. The consistency test includes the steps of: selecting one from the geometry shapes; reading geometry information of the selected geometry shape, the geometry information including vertex coordinates $(v_0.x, v_0.y, v_0.z)$, $(v_1.x, v_1.y, v_1.z)$, and $(v_2.x, v_2.y, v_2.z)$ of the selected triangle; obtaining coordinate weight values $(w_1, w_2, w_3)$ of the occluding point by solving an equation of $$[p.x \quad p.y \quad 1] = [w_1 \quad w_2 \quad w_3] * \begin{bmatrix} v_0.x & v_0.y & 1 \\ v_1.x & v_0.y & 1 \\ v_2.x & v_0.y & 1 \end{bmatrix},$$

in which (p.x, p.y, p.z) are the coordinates of the testing pixel; determining whether the selected geometry shape is consistent, according to the coordinate weight values of the occluding point $(w_1, w_2, w_3)$; and if the selected geometry shape is determined to be consistent, it is determined as the occluding geometry shape.

According to an embodiment of the present invention, the step of reconstructing the depth value of the occluding point further includes: obtaining the depth value T.z by solving an equation of $$T \cdot z = [w_1, w_2, w_3] \begin{bmatrix} v_0 \cdot z \\ v_1 \cdot z \\ v_2 \cdot z \end{bmatrix}.$$

According to an embodiment of the present invention, the step of reconstructing the depth value of the occluding point further includes: obtaining the depth value T.z by solving an equation of $$T.z = [w_1, w_2, w_3] * \begin{bmatrix} v_0.x & v_0.y & 1 \\ v_1.x & v_1.y & 1 \\ v_2.x & v_2.y & 1 \end{bmatrix} * \begin{bmatrix} v_0.x & v_0.y & 1 \\ v_1.x & v_1.y & 1 \\ v_2.x & v_2.y & 1 \end{bmatrix}^{-1} *$$

$$\begin{bmatrix} v_0 \cdot z \\ v_1 \cdot z \\ v_2 \cdot z \end{bmatrix} = [p.x \quad p.y \quad 1] * \begin{bmatrix} v_0.x & v_0.y & 1 \\ v_1.x & v_1.y & 1 \\ v_2.x & v_2.y & 1 \end{bmatrix}^{-1} * \begin{bmatrix} v_0 \cdot z \\ v_1 \cdot z \\ v_2 \cdot z \end{bmatrix}.$$

According to an embodiment of the present invention, the step of reconstructing the depth value of the occluding point further includes: obtaining the depth value T.z by solving an equation of $$T \cdot z = v_0 \cdot z + \frac{\partial z}{\partial x}(p \cdot x - v_0 \cdot x) + \frac{\partial z}{\partial y}(p \cdot y - v_0 \cdot y) =$$

$$v_0 \cdot z + (p \cdot x - v_0 \cdot x \quad p \cdot y - v_0 \cdot y) *$$

$$\begin{pmatrix} v_1 \cdot x - v_0 \cdot x & v_1 \cdot y - v_0 \cdot y \\ v_2 \cdot x - v_0 \cdot x & v_2 \cdot y - v_0 \cdot y \end{pmatrix}^{-1} * \begin{pmatrix} v_1 \cdot z - v_0 \cdot z \\ v_2 \cdot z - v_0 \cdot z \end{pmatrix}.$$

The present invention provides a method for reconstructing geometry mapping of a rasterized area. The method includes: finding a testing pixel within the rasterized area; finding an occluding point corresponding to the testing pixel in a geometry shadow map of the rasterized area; determining weight values of the occluding point according to the (x, y) coordinate values of the testing pixel and vertices of a triangle occluding the testing pixel in the rasterized area; determining depth value of the occluding point according to the weight value and z coordinate of the vertices of the occluding triangle; and comparing the depth value of the occluding point with the depth value of the testing pixel so as to determine whether the testing pixel is drawn in light or in shadow.

The present invention takes a light source as a viewing point for saving geometry information of a plurality of occluding geometry shapes of an object. And therefore, the present invention is adapted to reconstruct a depth value of an occluding point according to the position data of the testing pixel and the previously saved geometry information. After the depth value of the occluding point is obtained, it is then be compared with the depth value of the testing pixel, and finally completing the shadow determination of the testing pixel.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
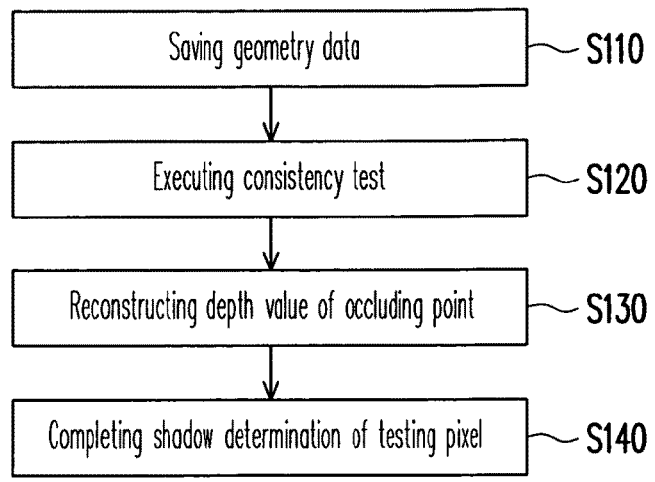
FIG. 1 is a flow chart illustrating a reconstructable geometry shadow mapping method according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Those of ordinary skill in the art may comply with the present invention by referring to the embodiments to be illustrated herebelow. However, it should be noted that the embodiments may also be applied in form of a computer program saved in a computer readable storage medium so as to allow a computer to execute the reconstructable geometry mapping method.

FIG. 1 is a flow chart illustrating a reconstructable geometry shadow mapping (RGSM) method according to an embodiment of the present invention. The RGSM method can be used to process a plurality of light sources. However, for simplicity and convenience of illustration, only one light source is exemplified in the current embodiment in depicting the RGSM method. In computer graphics, a surface of an object can be considered as constituted of a plurality of geometry shapes, e.g., triangles. In the current embodiment, it is supposed that the surface of the object is constituted of a plurality of triangles. Those of ordinary skill in the art may configure the surface of the object by any technologies.

Figure 2:
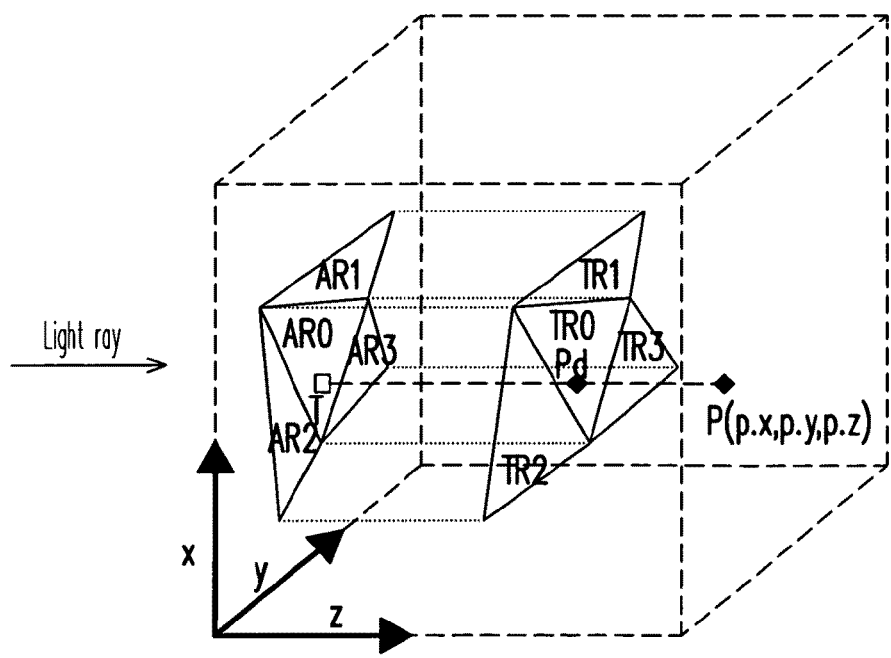
FIG. 2 illustrates a spatial correlation between a shadow map, a part of a surface of an object, and a testing pixel according to an embodiment of the present invention.

FIG. 2 illustrates a spatial correlation between a shadow map, a part of a surface of an object, and a testing pixel according to an embodiment of the present invention. The scene can be rendered from a light's point of view. For a point light source, the view can be a perspective projection. For a directional light source, an orthographic projection can be used. As shown in FIG. 2, the surface of an occluding object includes occluding triangles TR0, TR1, TR2, and TR3. Geometry information of each of the occluding triangles TR0 through TR3 are extracted and saved in geometry shadow maps. In other words, in step S110, the point light source is taken as a viewing point for saving geometry information of a plurality of geometry shapes of a certain object. In the current embodiment, the geometry information may include vertex coordinates of each geometry shape, e.g., vertex coordinates of the occluding triangles TR0 through TR3, or graphic indices of each geometry shape. The linear property of triangles in light canonical view volume and light view space allows us to reconstruct these occluding triangles with respect to a point light source, as well as a directional light source.

Then at step S120, a consistency test is performed on the testing pixel to find an occluding geometry shape from all of the geometry shapes. The occluding geometry shape includes an occluding point (the testing pixel overlaps with the occluding point in the geometry shadow map viewing from the light's point of view). In the step S120, by applying the geometry shadow maps, the scene can be drawn from a camera viewpoint. This process includes three major components. For each testing pixel of the object, e.g., the testing pixel P as shown in FIG. 2, the first major component is to find the coordinates (p.x, p.y, p.z) of the pixel P when viewing from the light source. The x and y values of the coordinates correspond to a position in the geometry map texture and are employed in the triangle consistency test for obtaining the occluding triangle.

According to step S120, it is found that the occluding triangle of the testing pixel P is TR0. Then at step S130, the geometry information of the occluding geometry shape and a position data of the testing pixel are utilized to reconstruct the depth value of the occluding point. In other words, the geometry information extracted and saved in step S110 are used to reconstruct the depth value of the occluding point for pixel P, e.g., the depth value of the occluding point Pd of FIG. 2.

Then at step S140, the depth value of the occluding point Pd is compared with the depth value of the testing pixel P, thus to perform the shadow determination of the testing pixel P. The z value of the testing pixel P from the light canonical view volume is then compared against the reconstructed depth value as determined in step S130 to perform the shadow determination. Finally the testing pixel must be drawn either in shadow or in light. If there is a plurality of light sources, separate geometry shadow maps must be employed for each light source.

Those skilled in the art may implement the present invention by referring to the foregoing description. Details of each step of FIG. 1 are going to be discussed herebelow without restricting the scope of the present invention. FIG. 2 illustrates a spatial correlation between a shadow map, a part of a surface of an object, and a testing pixel according to an embodiment of the present invention. FIG. 2 illustrates the RGSM method with a scenario where a point light source from the light's view space is transformed to a directional light source in the light canonical view volume. The scene in the light canonical view volume is supposed to be composed of adjacent triangles TR0, TR1, TR2 and TR3.

First, at step S110, the triangles TR0 through TR3 are respectively projected and rasterized to their corresponding areas AR0, AR1, AR2 and AR3 of the geometry shadow maps. Each texel in the areas AR0 through AR3 contains the geometry information, (e.g., vertex coordinates hereby) of their corresponding triangles. For example, the texel in AR0 contains the vertex coordinates of the triangle TR0 ($v_0.x$, $v_0.y$, $v_0.z$), ($v_1.x$, $v_1.y$, $v_1.z$), and ($v_2.x$, $v_2.y$, $v_2.z$). The operation of step S110 is almost the same as that of standard shadow maps, except that the step S110 saves the geometry information in the shadow map while the conventional technology saves the depth value in the shadow map. For point light source, the scene is transformed into the light canonical view volume, and three vertex coordinates of triangles are saved in the rasterized area of the shadow maps. An alternative way is to obtain a set of vertex coordinates from adjacent triangles. For example as shown in FIG. 2, coordinates of 6 vertices of adjacent triangles TR0, TR1, TR2 and TR3 are all saved in the rasterized area of TR0. As for the directional light source, vertex coordinates of a specified "working" light view space, in which light rays are parallel to the z-axis, are saved.

Next, a visible pixel P in an eye space is transformed into the canonical light volume with coordinates (p.x, p.y, p.z). The consistency test as of step S120 may include selecting one from the geometry shapes, e.g., triangles TR0 through TR3. The step S120 may include reading geometry information from the selected geometry shapes. For example, if the triangle TR0 is selected, geometry information of the area AR0 is read from the geometry shadow maps. The geometry information may include vertex coordinates of the geometry shape, e.g., vertex coordinates ($v_0.x$, $v_0.y$, $v_0.z$), ($v_1.x$, $v_1.y$, $v_1.z$), and ($v_2.x$, $v_2.y$, $v_2.z$) of the triangle TR0. According to the 2-D coordinates (p.x, p.y) of triangle TR0, the corresponding sampling point T can be found in the geometry shadow maps. Step S120 may include calculation of Equation (1) as follows so as to obtain 3-D coordinate weight values ($w_1$, $w_2$, $w_3$) of the occluding point Pd corresponds to the vertex of the triangle TR0.

$$[p \cdot x \quad p \cdot y \quad 1] = [w_1 \quad w_2 \quad w_3] * \begin{bmatrix} v_0 \cdot x & v_0 \cdot y & 1 \\ v_1 \cdot x & v_0 \cdot y & 1 \\ v_2 \cdot x & v_0 \cdot y & 1 \end{bmatrix}, \quad (1)$$

According to the 3-D coordinate weight values ($w_1$, $w_2$, $w_3$) of the occluding point Pd, it can be determined whether the selected geometry shape, i.e., the triangle TR0, is consistent.

For each visible pixel P, the occluding triangle TR0 needs to be correctly located so that the depth value of the occluding point Pd can be reconstructed then from its geometry information. This process is called as triangle consistency test. However, sampling texture maps with the (x, y) coordinates of a testing pixel P may not always return the data of a triangle that occludes the pixel P. If all of three weight values ($w_1$, $w_2$, $w_3$) calculated from Equation (1) are in the range of [0, 1], which means the triangle occludes the testing pixel P, the triangle test is determined as consistent. Otherwise the test is determined as inconsistent. If the triangle test is determined as consistent with respect to the selected geometry shape, then the geometry shape, i.e., the triangle TR0, is the occluding geometry shape of the testing pixel P.

Figure 3C:
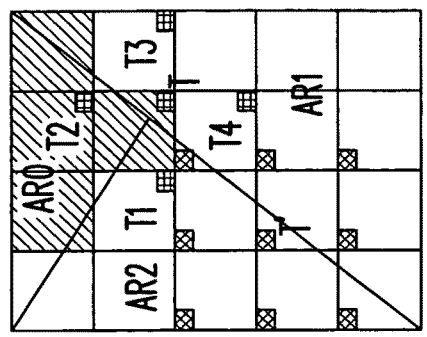
FIG. 3C illustrates two different patterns of sampling kernel according to the present invention.
Figure 3B:
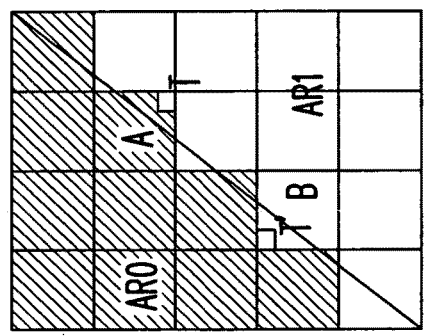
FIG. 3B illustrates two rasterized areas AR0 and AR1 of the triangles TR0 and TR1 of FIG. 3A.
Figure 3A:
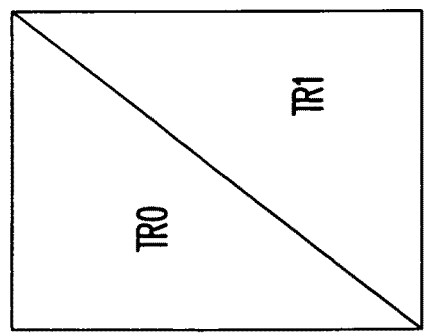
FIG. 3A illustrates two adjacent triangles TR0 and TR1.

An inconsistent result of a triangle test may be caused by the finite resolution of the shadow maps. The triangle test would more likely become inconsistent if the resolution of texture maps is relative low. FIG. 3A shows two adjacent triangles TR0 and TR1 having infinite resolutions. FIG. 3B illustrates two rasterized areas AR0 and AR1 of the triangles TR0 and TR1 of FIG. 3A. Under the finite resolutions, the area AR0 is the rasterized area of TR0, and the area AR1 is the rasterized area of TR1. Point T is the sampled point having the same (x,y) coordinate with the testing visible pixel P. However by sampling point T as shown in FIG. 3B, the texel A which carries the information of triangle TR0 is wrongly accessed. As shown in FIG. 3B, point T should be inside the rasterized area of TR1, information of the triangle TR0 can lead to an incorrect reconstruction of depth values (incorrectly determines the point T as the occluding point of the triangle TR0), due to the finite resolution of shadow maps. Sampling point T' in FIG. 3B suffers the same problem.

With the geometry information of adjacent triangles, it is more possible to find a triangle that occludes the testing pixel by sampling corresponding point. However, when two neighboring areas are rasterized, the geometry information of adjacent triangles may not be useful. In order to solve this problem, the present invention preferably employs more sampling points to include geometry information of more triangles, and thus increasing the opportunity of finding the consistent triangle test. FIG. 3C shows two patterns of sampling kernels T and T'. If the testing pixel P is occluded by multi-layers of surface, the kernel allows sorting all the depth results of consistent triangle tests and then obtaining the minimum value as the final depth value of the occluding point. Taking the pattern of the sampling kernel T as an example, except for calculating sampling point T by accessing texels of area AR0, depth values of sampling point T2, T1, T3 and T4 are calculated by accessing texels of area AR0, AR2 and AR1 respectively. Thereafter, all of the depth results (depth values of T, T1, T2, T3, and T4) of consistent triangle tests are sorted, and the minimum value is selected as the final depth value of the occluding point.

Selecting a proper kernel is important for accuracy. A larger kernel often provides better accuracy than a smaller one. However, a larger kernel containing many sampling points may decrease performance. A special kernel pattern shown in FIG. 3C can be used to achieve accuracy requirement with few sampling points. The number of sampling points can be reduced by setting the total number of consistent triangle tests of a certain testing pixel.

When the texture resolution is subcritical, which causes some occluding triangles failed to be saved into the shadow maps, the corresponding triangle tests must be inconsistent for the testing pixel P. To recover from this case, the triangle tests are sorted by the order of the weight distance to a central triangle, so that the triangle information corresponding to the "closest-distance" weight values is used for reconstruction. The calculated weight distance is a Euclidean one, as it is reasonable to assume that the reconstructed occluding point is in the same surface plane of the "closest-distance" triangle.

After obtaining the correct triangle information, the depth value of the occluding point which occludes the testing pixel P can be reconstructed. The depth value of the occluding point Pd of the occluding triangle TR0 can be reconstructed by triangle interpolation. After obtaining the weights by solving Equation (1), the depth value of the occluding point Pd T.z of step S130 can be reconstructed by $$T \cdot z = [w_1, w_2, w_3] \begin{bmatrix} v_0 \cdot z \\ v_1 \cdot z \\ v_2 \cdot z \end{bmatrix}, \quad (2)$$

or, a combination of Equations (1) and (2), as:

$$T \cdot z = [w_1, w_2, w_3] * \begin{bmatrix} v_0 \cdot x & v_0 \cdot y & 1 \\ v_1 \cdot x & v_1 \cdot y & 1 \\ v_2 \cdot x & v_2 \cdot y & 1 \end{bmatrix} * \begin{bmatrix} v_0 \cdot x & v_0 \cdot y & 1 \\ v_1 \cdot x & v_1 \cdot y & 1 \\ v_2 \cdot x & v_2 \cdot y & 1 \end{bmatrix}^{-1} * \quad (3)$$

$$\begin{bmatrix} v_0 \cdot z \\ v_1 \cdot z \\ v_2 \cdot z \end{bmatrix} = [p \cdot x \quad p \cdot y \quad 1] * \begin{bmatrix} v_0 \cdot x & v_0 \cdot y & 1 \\ v_1 \cdot x & v_1 \cdot y & 1 \\ v_2 \cdot x & v_2 \cdot y & 1 \end{bmatrix}^{-1} * \begin{bmatrix} v_0 \cdot z \\ v_1 \cdot z \\ v_2 \cdot z \end{bmatrix}.$$

As described above, the depth value of the occluding point Pd, T.z, of step S130 can be reconstructed according to Equation (3). Equation (3) demands an inverse operation of a 3×3 matrix. However, such an inverse operation of the 3×3 matrix is not directly supported by current graphics processing unit (GPU) hardware. As such, the 3×3 matrix must be decomposed into a few normal arithmetic and logic unit (ALU) instructions. However, a group of ALU instructions cannot guarantee the precision and may possibly introduce more related errors to the result of the inverse operation then propagate to the final reconstructed depth value.

For the purpose of providing a solution addressing to the above problem, Equation (3) is rewritten into an equivalent one as below, according to an embodiment of the present invention:

$$T \cdot z = v0 \cdot z + \frac{\partial z}{\partial x}(p \cdot x - v0 \cdot x) + \frac{\partial z}{\partial y}(p \cdot y - v0 \cdot y) = \quad (4)$$

$$v0 \cdot z + (p \cdot x - v0 \cdot x \quad p \cdot y - v0 \cdot y) *$$

$$\begin{pmatrix} v1 \cdot x - v0 \cdot x & v1 \cdot y - v0 \cdot y \\ v2 \cdot x - v0 \cdot x & v2 \cdot y - v0 \cdot y \end{pmatrix}^{-1} * \begin{pmatrix} v1 \cdot z - v0 \cdot z \\ v2 \cdot z - v0 \cdot z \end{pmatrix}.$$

As such, the depth value of the occluding point Pd, T.z, of step S130 can be reconstructed according to Equation (4).

By comparing the canonical volume depth values of the occluding point Pd and the testing pixel P (comparing T.z with p.z), the shadow determination of P can be finally performed in step S140.

Figure 4A:
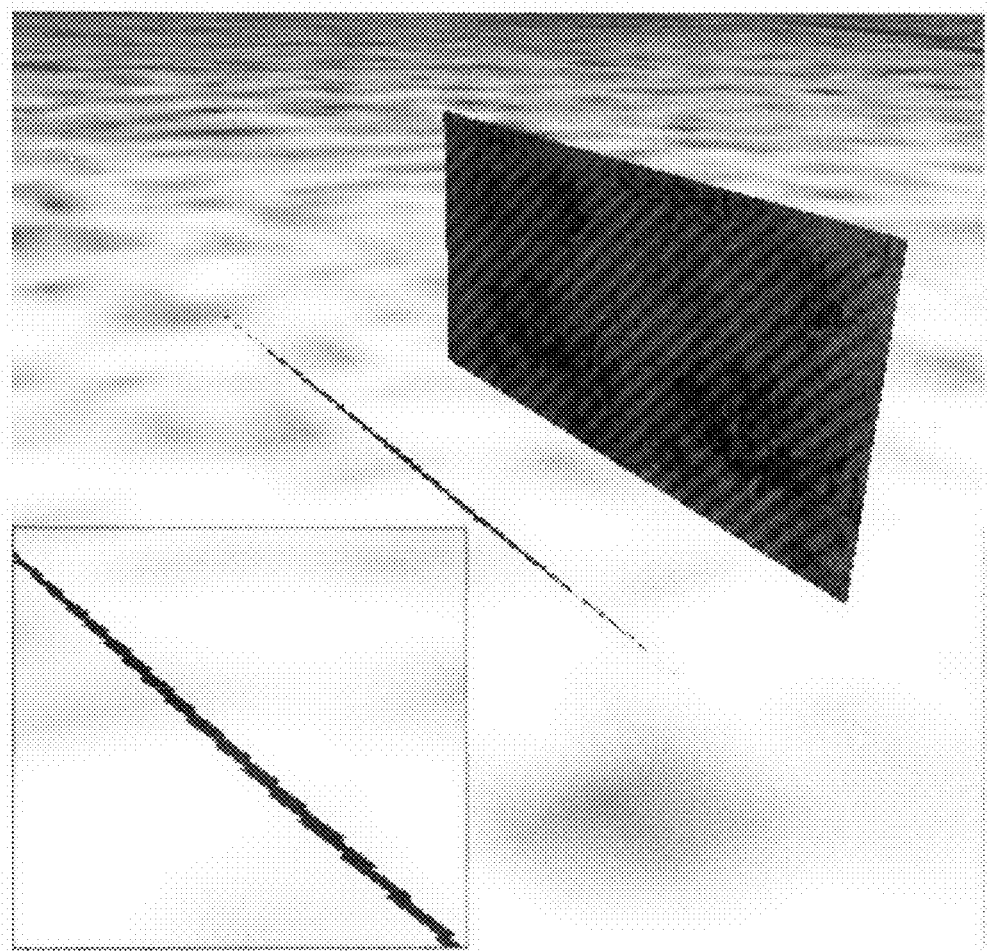
FIG. 4A illustrates a projection aliasing error occurred in a standard shadow map.
Figure 4B:
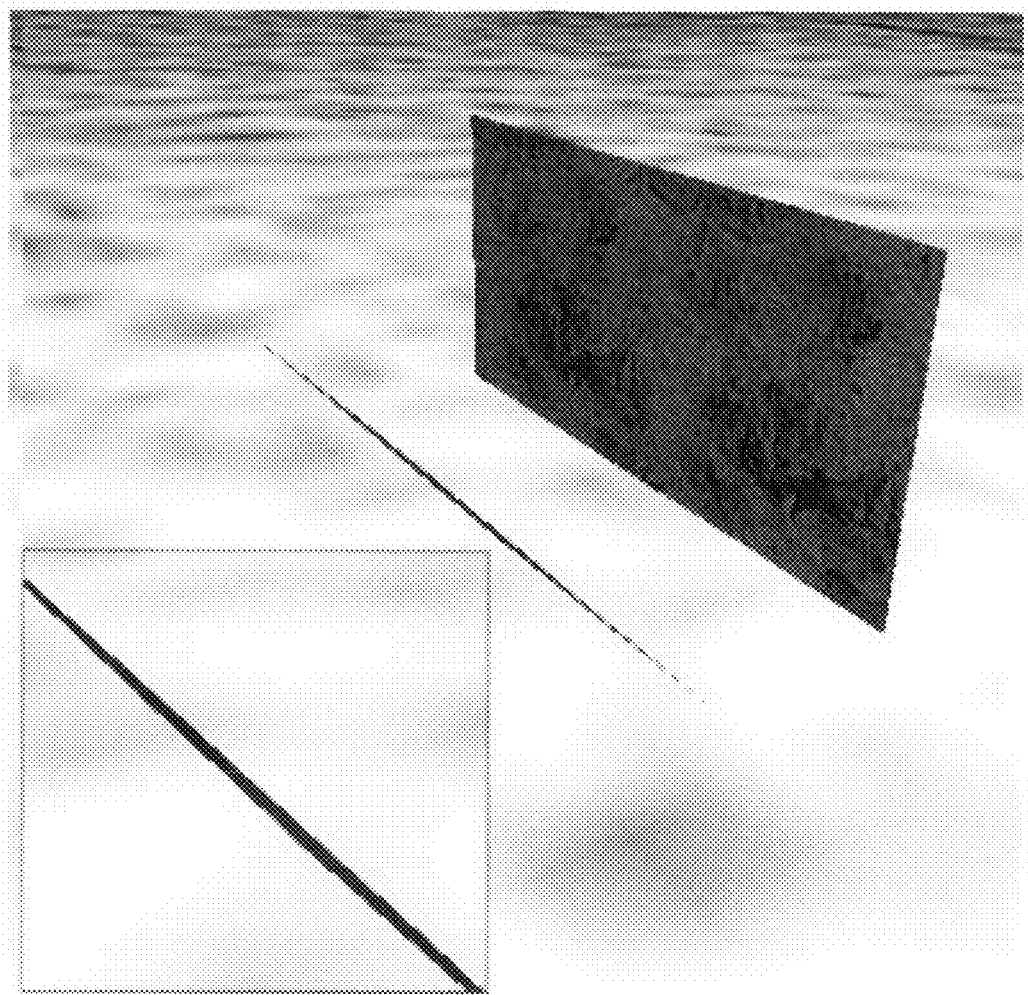
FIG. 4B illustrates a projection aliasing artifact produced by the reconstructable geometry shadow map (RGSM) according to an embodiment of the present invention.

FIG. 4A illustrates a projection aliasing error occurred in a standard shadow map. FIG. 4A shows a quadrangular plate floating over a bottom plane, in which the quadrangular plate projects a strip shaped shadow at the bottom plane. Referring to FIG. 4A, there is shown a partial zoom-in view of the strip shaped shadow. As shown in FIG. 4A, the projection aliasing error occurred in a standard shadow map is very apparent. On the contrary, FIG. 4B illustrates a projection aliasing artifact produced by the reconstructable geometry shadow map (RGSM) according to an embodiment of the present invention. As shown in FIG. 4B, the same scene is rendered by RGSM according to the present invention. Comparing FIG. 4A with FIG. 4B, it is apparent that the image rendered by RGSM has been much improved with the projection aliasing errors relative to the image rendered by the standard shadow map.

Figure 5A:
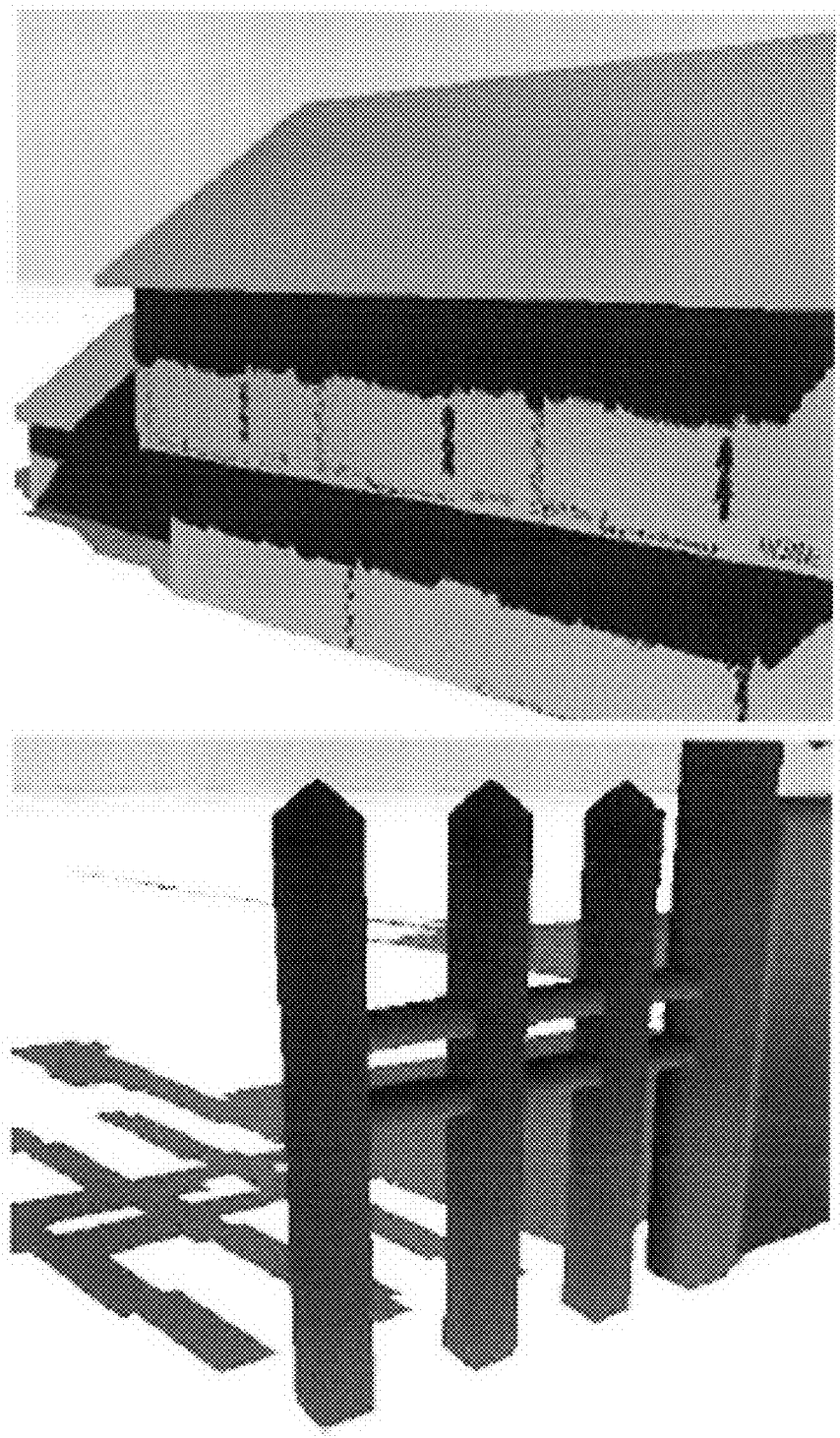
FIG. 5A shows an image produced by a standard shadow map with a constant depth bias technology with a depth bias value of 1e-3.
Figure 5B:
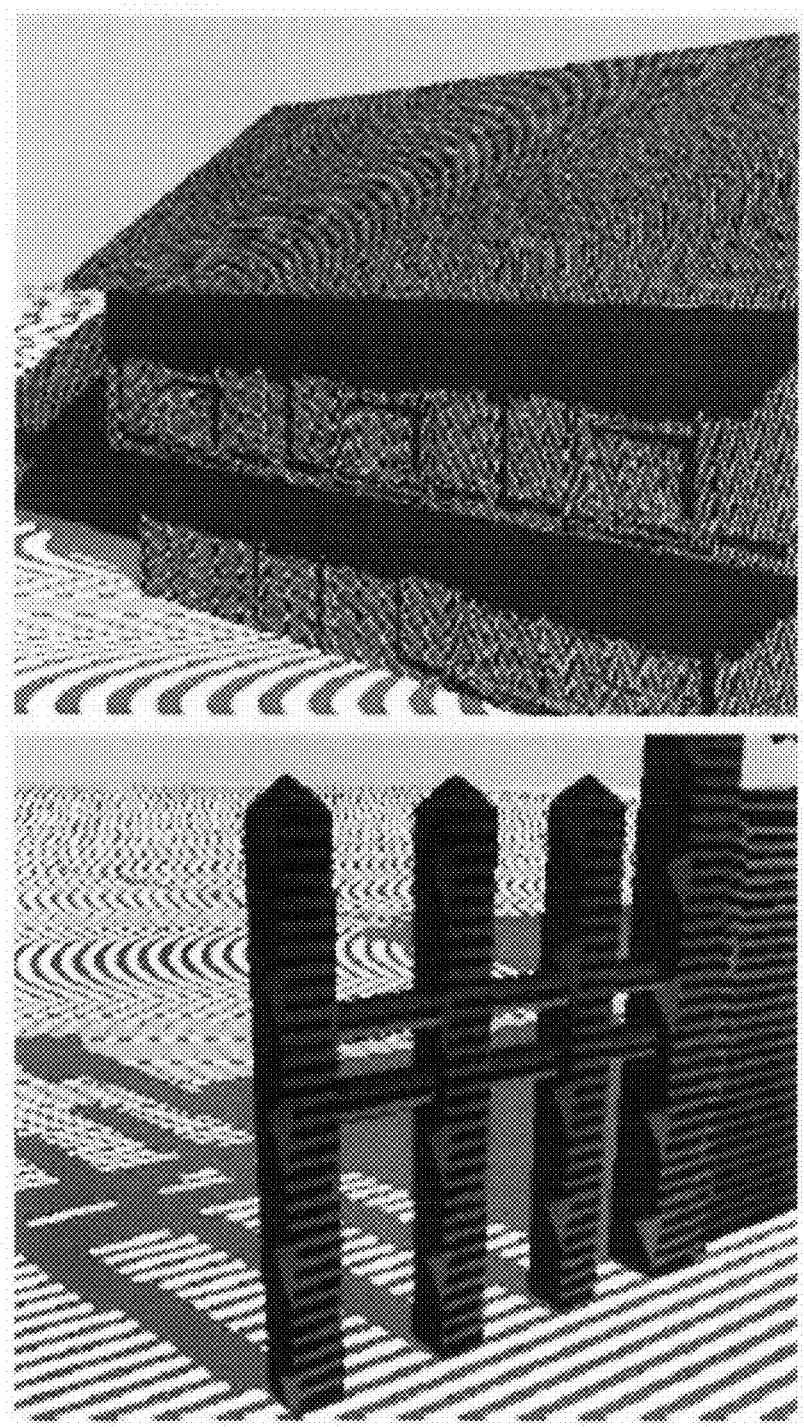
FIG. 5B shows an image produced by a standard shadow map with a constant depth bias technology with a depth bias value of 1e-6.
Figure 5C:
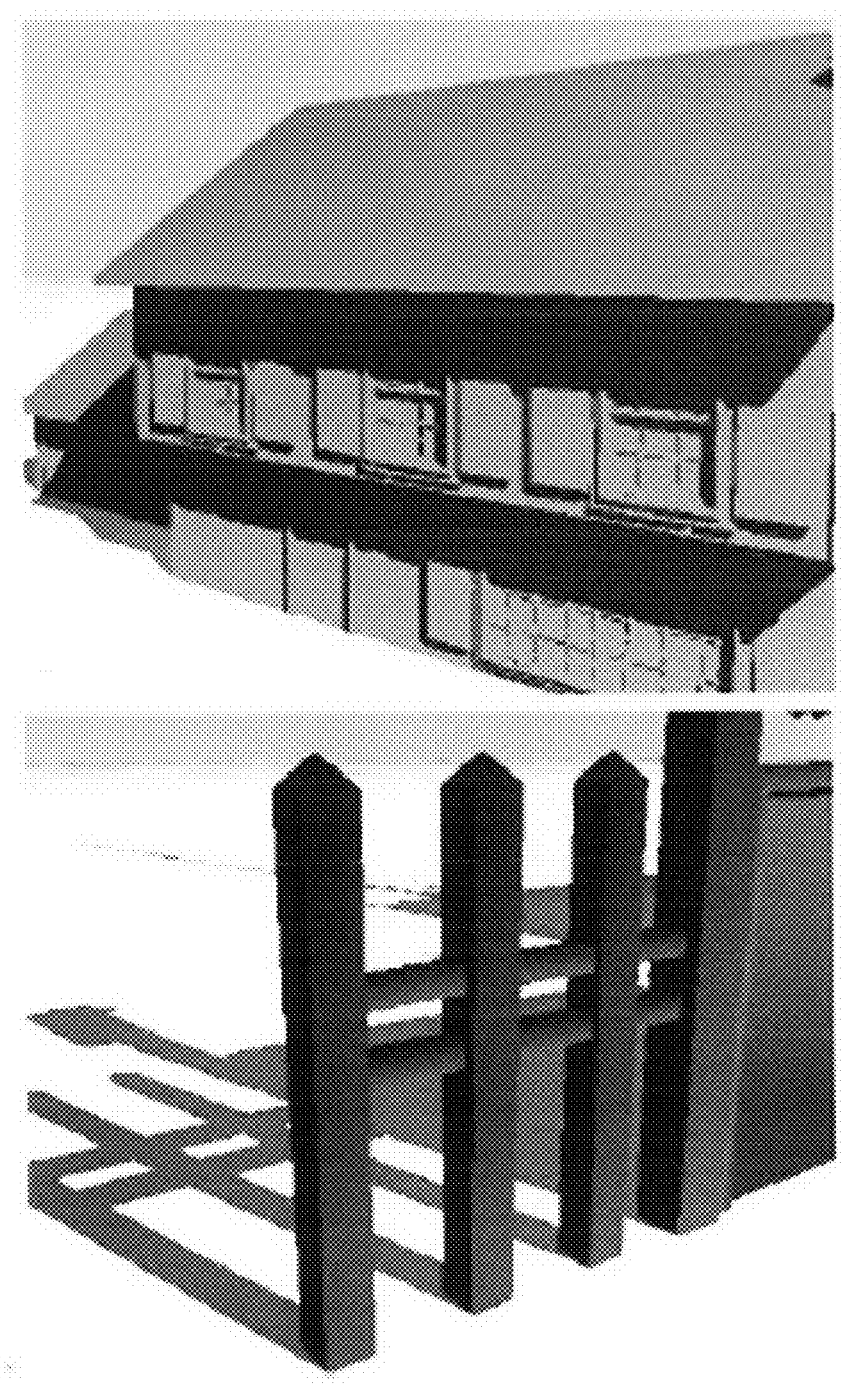
FIG. 5C shows a graphic depth bias testing image produced by an RGSM with a depth bias value of 1e-6, according to an embodiment of the present invention.

The depth bias issue is another problem of most shadow mapping technologies. FIGS. 5A, 5B, and 5C illustrate same scene for different depth bias test methods, the scene includes a house and a fence. FIG. 5A shows an image produced by a standard shadow map with a constant depth bias technology (the depth bias value is 1e-3) for avoiding an erroneous self-shadowing problem. In other words, it adds a depth bias value into depth samples before comparing with a true surface. Because the depth bias value of FIG. 5A is too large, the depth bias may cause false non-shadowing (looks like a light occluding object floating above the surface of a light receiver) and push the shadow backward too much. In fact, it is very hard to directly determine the bias value, and it is even impossible to find out an acceptable common value for every simple scenes. For example, FIG. 5B shows an image produced by a standard shadow map with a constant depth bias technology having a depth bias value of 1e-6. As shown in FIG. 5B, in order to improve the erroneous non-shadowing problem, a smaller depth bias value (1e-6) is used. However, although the erroneous non-shadowing error can be improved, it unfortunately causes an erroneous self-shadowing problem as shown in FIG. 5B. FIG. 5C shows a graphic depth bias testing image produced by RGSM with a depth bias value of 1e-6, according to an embodiment of the present invention. In other words, FIG. 5C employs the RGSM algorithm as a solution for the depth bias issue. The depth bias value of FIG. 5C is 1e-6, which is same with FIG. 5B. It can be learnt from FIG. 5C, the RGSM algorithm according to the embodiment of the present invention adapts a very small depth bias value, and does not cause any erroneous self-shadowing problem.

In general, the embodiment of the present invention is adapted to guarantee a pixel-wise depth accuracy, and has the following advantages.

1. It can produce accurate shadow edges by reducing both perspective aliasing and projective aliasing, and it can also remove the shadow edge jitters in dynamic scenes.
2. It has a much smaller depth bias value than other shadow map technologies, and programmers can meet the needs of most applications by setting a uniform and constant bias value and produce images without false shadowing or false non-shadowing artifacts while utilizing RGSM.
3. It uses only a fraction of memory space of standard shadow maps on the premise of the same output shadow quality and can run at a high speed.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A reconstructable geometry mapping method comprising:
    extracting geometry information of a plurality of occluding geometry shapes of an object's front-face with respect to a light source's point of view;
    performing a consistency test on a testing pixel so as to determine an occluding geometry shape corresponding to the testing pixel from the object's front-face among the plurality of occluding geometry shapes;
    reconstructing a depth value of an occluding point corresponding to the testing pixel; and
    performing a shadow determination of the testing pixel,
    wherein coordinates of the testing pixel are (p.x, p.y, p.z), and the consistency test comprises:
    selecting one of the geometry shapes;
    reading geometry information of the selected geometry shape, the geometry information including vertex coordinates $(v_0.x, v_0.y, v_0.z)$, $(v_1.x, v_1.y, v_1.z)$, and $(v_2.x, v_2.y, v_2.z)$ of the selected geometry shape;
    obtaining coordinate weight values $(w_1, w_2, w_3)$ of the occluding point by solving an equation of $$[p \cdot x \quad p \cdot y \quad 1] = [w_1 \quad w_2 \quad w_3] * \begin{bmatrix} v_0 \cdot x & v_0 \cdot y & 1 \\ v_1 \cdot x & v_1 \cdot y & 1 \\ v_2 \cdot x & v_2 \cdot y & 1 \end{bmatrix};$$

determining whether the selected geometry shape is consistent according to the coordinate weight values $(w_1, w_2, w_3)$ of the occluding point; and
    determining the selected geometry shape as the occluding geometry shape-when the selected geometry shape is determined to be consistent.

2. The reconstructable geometry mapping method according to claim 1, wherein the occluding geometry shapes are triangles.

3. The reconstructable geometry mapping method according to claim 1, wherein the geometry information comprises vertex coordinates or geometry indices of the occluding geometry shapes.

4. The reconstructable geometry mapping method according to claim 1, wherein the step of reconstructing the depth value of the occluding point comprises:
    obtaining the depth value T.z of the occluding point by solving an equation of $$T \cdot z = [w_1, w_2, w_3] \begin{bmatrix} v_0 \cdot z \\ v_1 \cdot z \\ v_2 \cdot z \end{bmatrix}.$$

5. The reconstructable geometry mapping method according to claim 1, wherein the step of reconstructing the depth value of the occluding point comprises:
    obtaining the depth value T.z of the occluding point by solving an equation of $$T \cdot z = [w_1, w_2, w_3] * \begin{bmatrix} v_0 \cdot x & v_0 \cdot y & 1 \\ v_1 \cdot x & v_1 \cdot y & 1 \\ v_2 \cdot x & v_2 \cdot y & 1 \end{bmatrix} * \begin{bmatrix} v_0 \cdot x & v_0 \cdot y & 1 \\ v_1 \cdot x & v_1 \cdot y & 1 \\ v_2 \cdot x & v_2 \cdot y & 1 \end{bmatrix}^{-1} * \begin{bmatrix} v_0 \cdot z \\ v_1 \cdot z \\ v_2 \cdot z \end{bmatrix}$$

which can be rewritten as, $$T \cdot z = [p \cdot x \quad p \cdot y \quad 1] * \begin{bmatrix} v_0 \cdot x & v_0 \cdot y & 1 \\ v_1 \cdot x & v_1 \cdot y & 1 \\ v_2 \cdot x & v_2 \cdot y & 1 \end{bmatrix}^{-1} * \begin{bmatrix} v_0 \cdot z \\ v_1 \cdot z \\ v_2 \cdot z \end{bmatrix}.$$

6. The reconstructable geometry mapping method according to claim 1, wherein the step of reconstructing the depth value of the occluding point comprises:
    obtaining the depth value T.z of the occluding point by solving an equation of $$T \cdot z = v_0 \cdot z + \frac{\partial z}{\partial x}(p \cdot x - v_0 \cdot x) + \frac{\partial z}{\partial y}(p \cdot y - v_0 \cdot y)$$

which can be rewritten as, $$T \cdot z = v_0 \cdot z + (p \cdot x - v_0 \cdot x \quad p \cdot y - v_0 \cdot y) * \begin{pmatrix} v_1 \cdot x - v_0 \cdot x & v_1 \cdot y - v_0 \cdot y \\ v_2 \cdot x - v_0 \cdot x & v_2 \cdot y - v_0 \cdot y \end{pmatrix}^{-1} * \begin{pmatrix} v_1 \cdot z - v_0 \cdot z \\ v_2 \cdot z - v_0 \cdot z \end{pmatrix}.$$

7. The reconstructable geometry mapping method according to claim 1, wherein the occluding geometry shape comprises the occluding point, and the testing pixel overlaps with the occluding point when viewing from the light source.

8. The reconstructable geometry mapping method according to claim 1, wherein the depth value of the occluding point is reconstructed according to the geometry information of the occluding geometry shapes and a position data of the testing pixel.

9. The reconstructable geometry mapping method according to claim 1, wherein the step of performing a shadow determination of the testing pixel is achieved by comparing a depth value of the occluding point with a depth value of the testing pixel.

* * * * *